United States Patent [19]

Wang et al.

[11] 4,395,543
[45] Jul. 26, 1983

[54] SELECTIVE SOLVENT EXTRACTION OF CELLULOSIC MATERIAL

[75] Inventors: Daniel I. C. Wang, Belmont; George C. Avgerinos, Newton Center, both of Mass.

[73] Assignee: Massachusetts Institute of Technology, Cambridge, Mass.

[21] Appl. No.: 292,314

[22] Filed: Aug. 12, 1981

[51] Int. Cl.³ .................................................. C08B 1/00
[52] U.S. Cl. ........................................ 536/56; 127/37
[58] Field of Search ...................... 536/56; 162/77, 90, 162/97; 127/37

[56] References Cited

U.S. PATENT DOCUMENTS

| | | | |
|---|---|---|---|
| 1,941,817 | 1/1934 | Sweeney et al. | 536/56 |
| 2,959,500 | 11/1960 | Schlapfer et al. | 127/37 |
| 3,784,408 | 1/1974 | Jaffe et al. | 127/37 |
| 3,935,022 | 1/1976 | Sihtola | 536/56 |
| 4,104,463 | 8/1978 | Antrim et al. | 127/37 |
| 4,239,906 | 12/1980 | Antrim et al. | 536/56 |

OTHER PUBLICATIONS

Ott et al., Cellulose and Cellulose Derivatives, 2nd completely revised and augmented edition, Interscience Publishers, Inc., N.Y., N.Y., pp. 488-494.

*Primary Examiner*—Ronald W. Griffin
*Attorney, Agent, or Firm*—Arthur A. Smith, Jr.; Paul J. Cook

[57] ABSTRACT

Cellulosic products having a high hemicellulose to lignin weight ratio are obtained by extracting a cellulosic composition with basic ethanol-water solution having a pH between about 12 and about 14 at a temperature between about 15° and about 70° C. and for a time period between about 2 and about 80 hours.

10 Claims, 6 Drawing Figures

SELECTIVE SOLVENT EXTRACTION OF CELLULOSIC MATERIAL

The Government has rights in this invention pursuant to D.O.E. Subcontract Number XR-9-8109-1, (S.E.R.I. Prime Contract Number EG-77-C-01-4042), awarded by the U.S. Department of Energy.

BACKGROUND OF THE INVENTION

This invention relates to a process for selectively extracting lignin from cellulosic materials. The lignin component of lignocellulosic materials is widely recognized as a major limiting factor to rapid degradation and utilization of plant polysaccharides by microorganisms. A major method for complete delignification of biomass practiced by the pulp and paper industry utilizes alkaline pretreatment. In the presence of 5% alkali, at temperatures from 130° to 180° C., the cleavage of ether and carbon bonds readily occurs resulting in the depolymerization and solubilization of the lignin polymer. However, under these conditions, the major portion of the hemicellulose carbohydrates are also solubilized and subsequently degraded to saccharinic acids. These carbohydrate degradation products are not utilized and are toxic to many microorganisms.

The low temperature alkaline treatment of poor quality rough grasses has been shown to increase their nutritive quality as animal feed as shown by Beckman, Chemical Abstracts, 16:765 (1921). However, unless the alkali solubilized lignin is removed, the treatment does not substantially improve the use of the treated grasses in fermentation processes for the production of chemicals or liquid fuels such as ethanol. Furthermore, delignification under these conditions also results in substantial removal of pentosan and uronic acid hemicellulose carbohydrates. Although this type of pretreatment has been shown to markedly enhance the subsequent fermentative utilization of the cellulose remaining, it is not an acceptable delignification method since the hemicellulose carbohydrate fraction removed with the solvent is no longer available as substrate for the fermentation process.

It has been proposed to utilize cold alkaline ethanolic solutions for the isolation of polyuronides from cocks foot grass by Buston, Bio. Chem. J., 28:1028 (1934). It has also been proposed to use these solutions with straws in order to prepare pure hemicelluloses, Norman, Bio. Chem. J., 29:945 (1935). However, the process of Norman was capable of delignifying the straw only one third to one half of acceptable levels. It is believed that one reason for this is that Norman utilized a small amount of acetic acid in the solvent wash. Furthermore, the time period utilized by Norman in the solvent extraction process was insufficient to promote selective extraction of lignin.

Accordingly, it would be highly desirable to provide a solvent extraction process for selectively solubilizing lignin from a cellulosic material while minimizing solubilization of cellulose or hemicellulose. Such a process would be capable of producing a novel delignified cellulosic material which could be utilized, for example, in the fermentative production of ethanol.

SUMMARY OF THE INVENTION

The present invention is based upon the discovery that by utilizing a solvent solution comprising ethanol, water and a base, and by controlling solvent pH, temperature and by maintaining sufficient residence time of a cellulosic material in the solvent, a delignified product is obtained that retains the great majority of the hemicellulose portion thereof. The novel product produced has a high weight ratio of pentosan to lignin of at least about 6 and preferably at least about 5. The product then can be converted to ethanol, acetate and lactate by being fermented with a mixed culture of Clostridium thermocellum ATCC No. 31924 and Clostridium thermosaccharolyticum ATCC N. 31925. The product of this invention provides the advantages of obtaining a greater yield of fermentation products including ethanol based upon the weight of original cellulosic material and increasing the rate of fermentation obtainable. Therefore, the products of this invention permit substantial economic advantages over fermentation processes of the prior art.

DESCRIPTION OF SPECIFIC EMBODIMENTS

Figure 1:
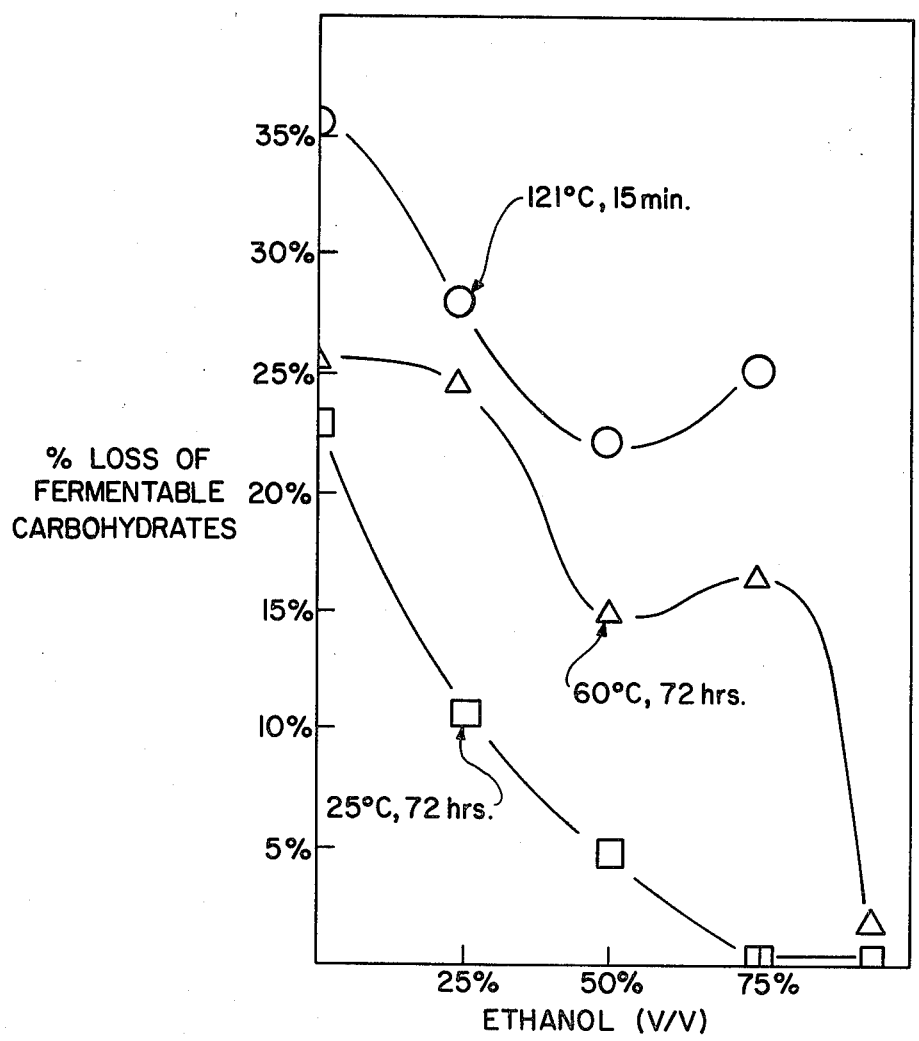

In accordance with this invention, a cellulosic feed stock is delignified selectively in a manner to maximize lignin solubilization and minimize cellulose and hemicellulose solubilization. Exemplary suitable cellulosic feed stocks include corn stover (stalk and cob) and straws such as wheat and rice straw. In order to promote extraction efficiency, it is preferred that the cellulosic feed stock be chopped or ground into particles typically of a size between about 10 and about 100 mesh, preferably between about 20 and 40 mesh.

The solvent solution utilized in this invention is an ethanol-water solution containing a base. The ethanol concentration of the solvent is between about 40 and about 75 volume percent while sufficient base is added to render the pH of the resultant solvent between about 11 and about 14, preferably between about 12 and about 14. Representative suitable bases include sodium hydroxide, potassium hydroxide, lithium hydroxide, sodium sulphite and ammonia. Calcium hydroxide and sodium carbonate may be used to generate sodium hydroxide. Sodium carbonate may be used as a buffer. Calcium hydroxide alone cannot be used since the cation causes lignin to precipitate. It is necessary to operate within the above pH range in order to effect substantial lignin solubilization while minimizing hemicellulose or cellulose solubilization.

It has also been found that the temperature of the solvent during the extraction is important in order to minimize cellulose or hemicellulose solubilization while maximizing lignin solubilization. In accordance with this invention, the temperature of the solvent during extraction should be maintained between about 15° and about 70° C., preferably between about 20° and 30° C. An extraction time of between about 2 and 80 hours and mixing also have been found to be important.

The lignin content decreases to 67% of its initial value after contacting for 48 hours 4 gms of approximately 40 mesh substrate with 100 ml of solvent in a 250 ml flask agitated in a shaker with a 4 cm stroke at 200 rpm. Alternatively, the material may be statically contacted for longer times of approximately 70 hrs with equivalent results. An industrial application of this invention is made more suitable by a counter current method of continuously contacting the solids with the extracting solvent as in many common leaching operations. Much higher ratios of solid to liquid feed can be obtained, preferably between 200 and 500 g solid per liter of liquid. The extracting solvent can be recovered by addition of calcium, lowering the pH to below about 7 or filtering the solution such as with carbon to remove the lignin.

When operating under the solvent extraction conditions set forth above, at least about 60%, preferably at least about 67% of the lignin in the original cellulosic feed stock is solubilized while less than about 10%, preferably less than about 6% of the cellulose and pentosan in the original cellulosic feed stock is solubilized. Prior to the present invention, this treatment yielding a product containing less than about 5% lignin and at least about 95% of the original cellulose and pentosan has not been obtained. Thus, the novel product of this invention has a high weight ratio of pentosan to lignin of at least about 5:1 and preferably at least about 6:1 and the weight ratio of pentosan and cellulose to lignin is at least about 10:1 and preferably at least about 13:1.

The following example illustrates the present invention and is not intended to limit the same.

EXAMPLE I

In contrast to the process of this invention, pretreatment of corn stover with dilute alkali results in a high degree of delignification at low temperatures where lignin depolymerization by ether or carbon bond cleavage does not occur to any significant extent (Table 1). However, this also leads to a significant loss of hemicellulose as measured by the loss of pentosan.

TABLE 1

DELIGNIFICATION OF CORN STOVER WITH 0.2 N NaOH

| Temp. | Time | % Delignification | % Loss of Pentosan |
|---|---|---|---|
| 121° C. | 15 min | 91 | 42 |
| 60° C. | 24 hrs | 81 | 38 |
| 25° C. | 72 hrs | 62 | 38 |

Corn stover passing through a 0.5 mm mesh screen after Wiley milling was extracted at temperatures from 4° to 121° C. in ethanolic/aqueous solutions up to 95% and 0.2 N NaOH. Residual biomass solids were separated by centrifugation or by filtration on Scheicher and Schuell #595 filter paper. The 50° C. dried solids were analyzed for α-cellulose, pentosan, lignin and ash. Fermentation of the residual solids was conducted by mixed cultures of *C. thermocellum* ATCC 31924 and *C. thermosaccharolyticum* ATCC 31925 in anaerobic flasks with pH control.

Figure 2:
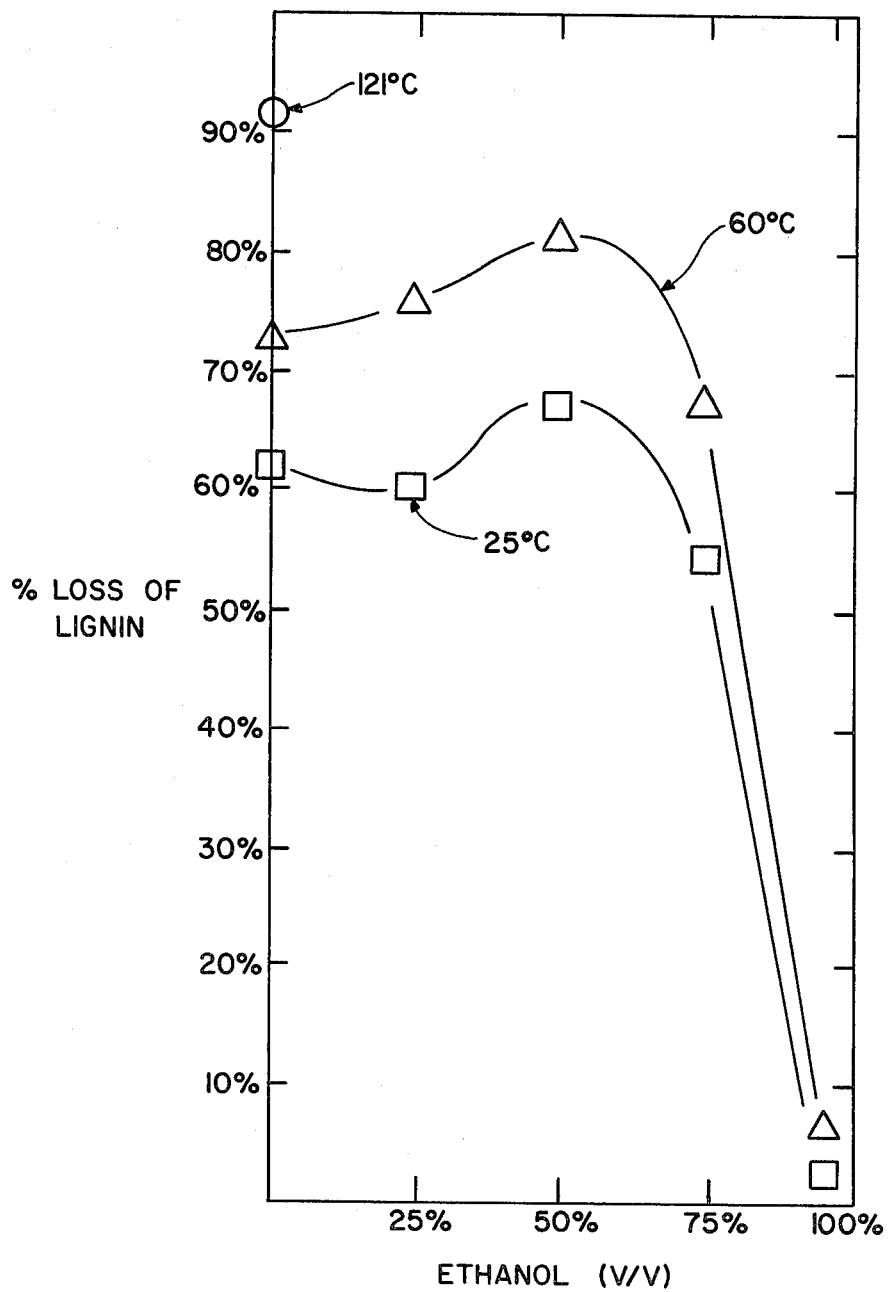
Figure 3:
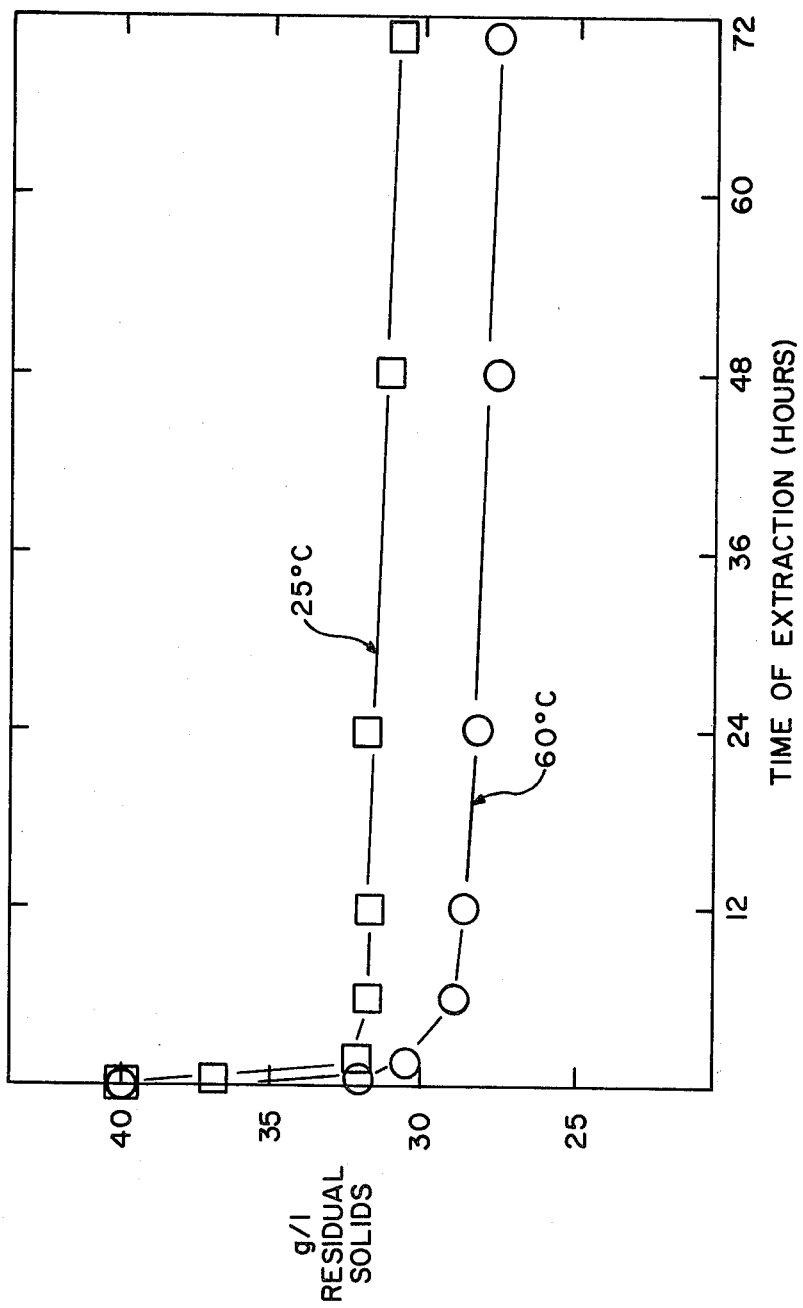

Alkaline solutions containing 8 g/l NaOH and up to 95% ethanol were examined as extractants of corn stover. The loss of fermentable carbohydrates from corn stover (reported as the loss of α-cellulose and pentosans × 1.28) were found to decrease from 35% to a minimum of 24% with the addition of 50% ethanol when the extractions were conducted at 121° C. for 15 minutes (FIG. 1). However, extractions carried out at 25° C. for 72 hours demonstrated substantially reduced carbohydrate losses, decreasing from 24% with no ethanol to less than 5% in the presence of 50% ethanol. As can be seen in FIG. 2, the addition of ethanol up to 50 vol percent enhanced the removal of lignin from the corn residue at each temperature examined, although concentrations above 50 vol percent resulted in a decrease in the percentage of lignin removed. A comparison of the extent of lignin removal versus carbohydrate loss shows that at ambient temperature in the presence of 50 vol percent ethanol greater than 65% delignification occurs with less than a 5% loss of fermentable α-cellulose and pentosan carbohydrate. Although these low temperature extractions were accomplished for 72 hours without external mixing, an examination of the kinetics of delignification shows this process to be substantially complete in less than 50 hours at 25° C. with external mixing provided by agitation of 100 ml of solution in a 250 ml flask at 200 rpm in a rotary shaker with 4 cm stroke (see FIG. 3, Table 2).

TABLE 2

CORN STOVER COMPOSITION AFTER EXTRACTION WITH 50% ETOH/H$_2$O (V/V) AND 0.2 N NaOH AT 25° C. FOR 72 HRS

|  |  | Extracted |
|---|---|---|
| Dry Weight | 100 | 76.8 |
| α-cellulose | 32.0 | 31.6 |
| Pentosan | 29.4 | 26.9 |
| Lignin | 13.2 | 4.4 |
| Ash | 9.0 | 7.7 |
| Crude Protein | 4.2 | — |

Figure 4:
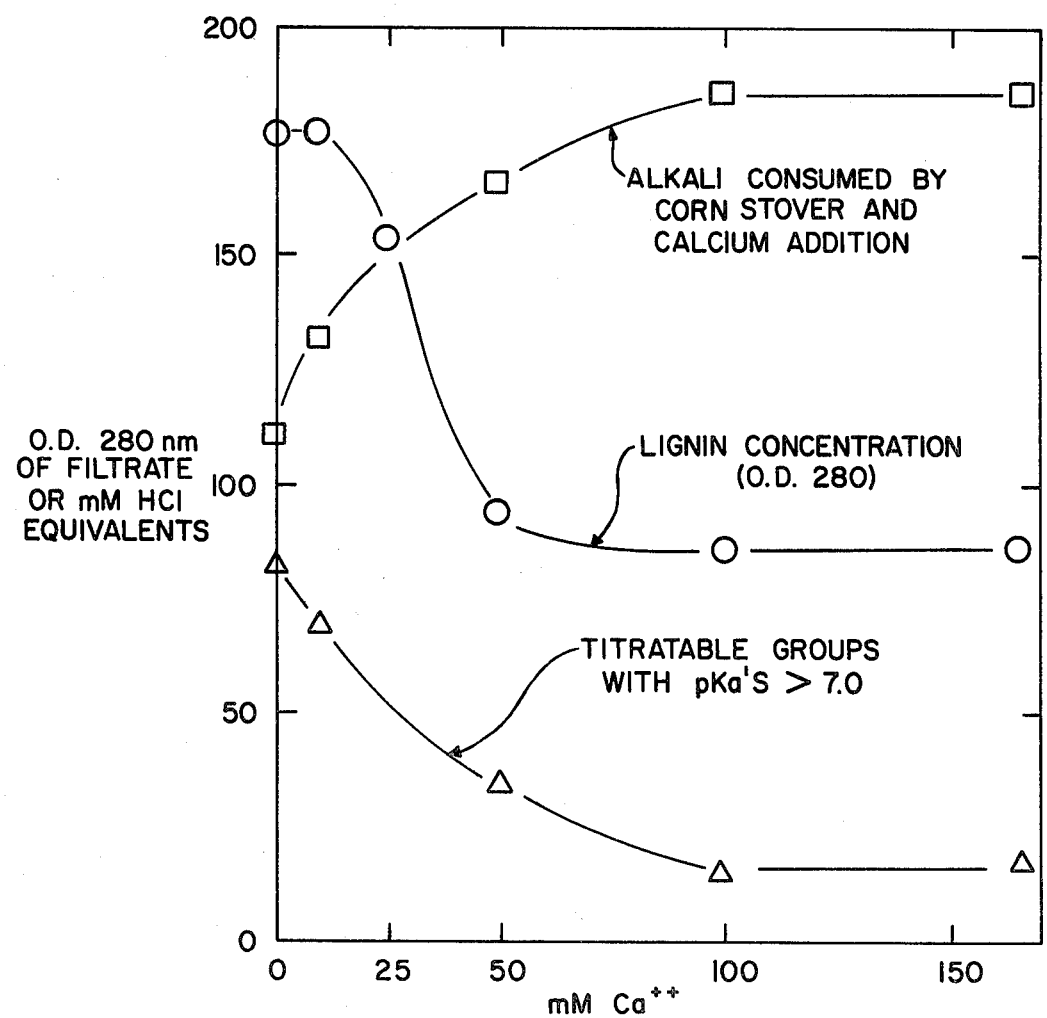

In FIG. 4, the effect of $Ca^{++}$ addition to alkaline 50% ethanolic extract of 40 g/l corn stover shows greater than 50% reduction in lignin (by O.D. 280 nm) with the addition of up to 50 mM $Ca^{++}$ ions. Adsorption of lignin resulting in virtually 100% reduction of O.D. 280 has been shown by treatment with activated carbon as well.

Figure 5:
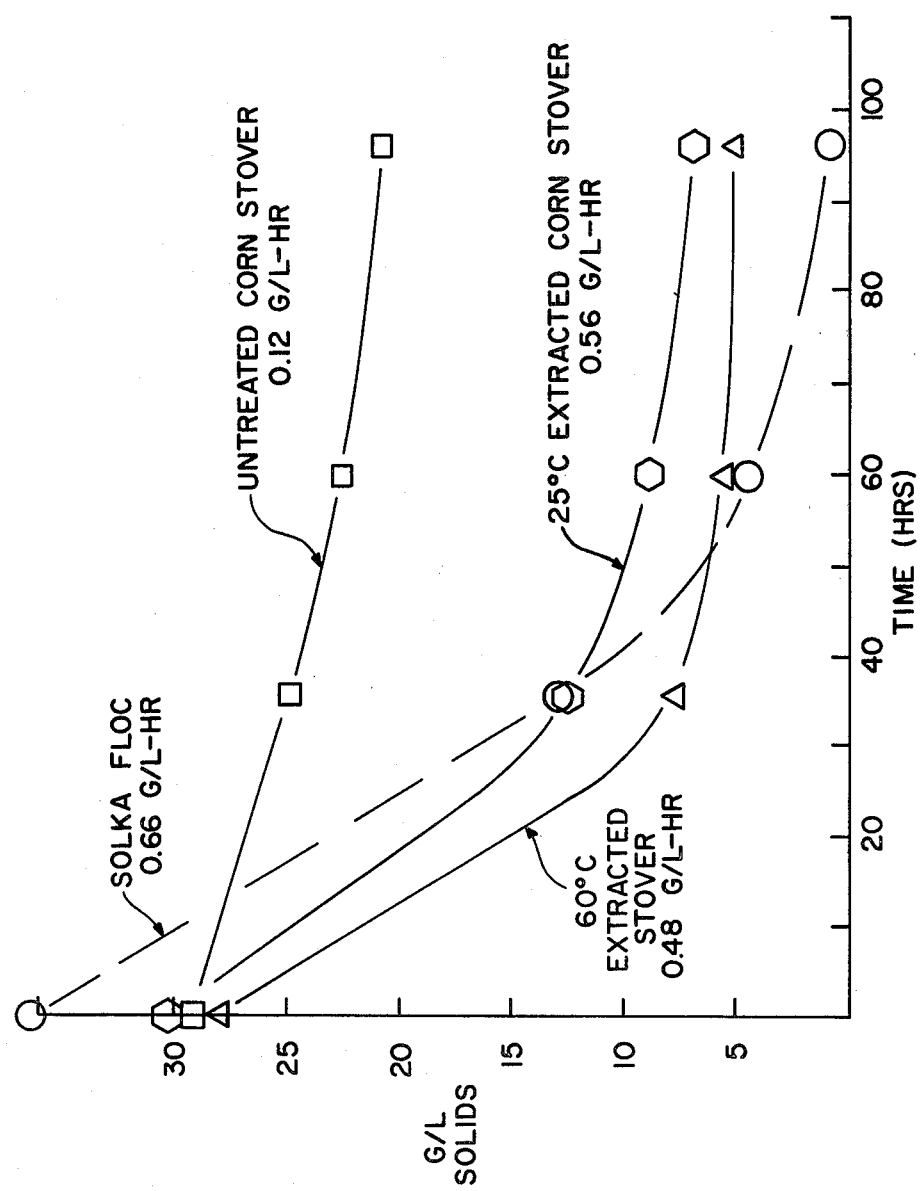
Figure 6:
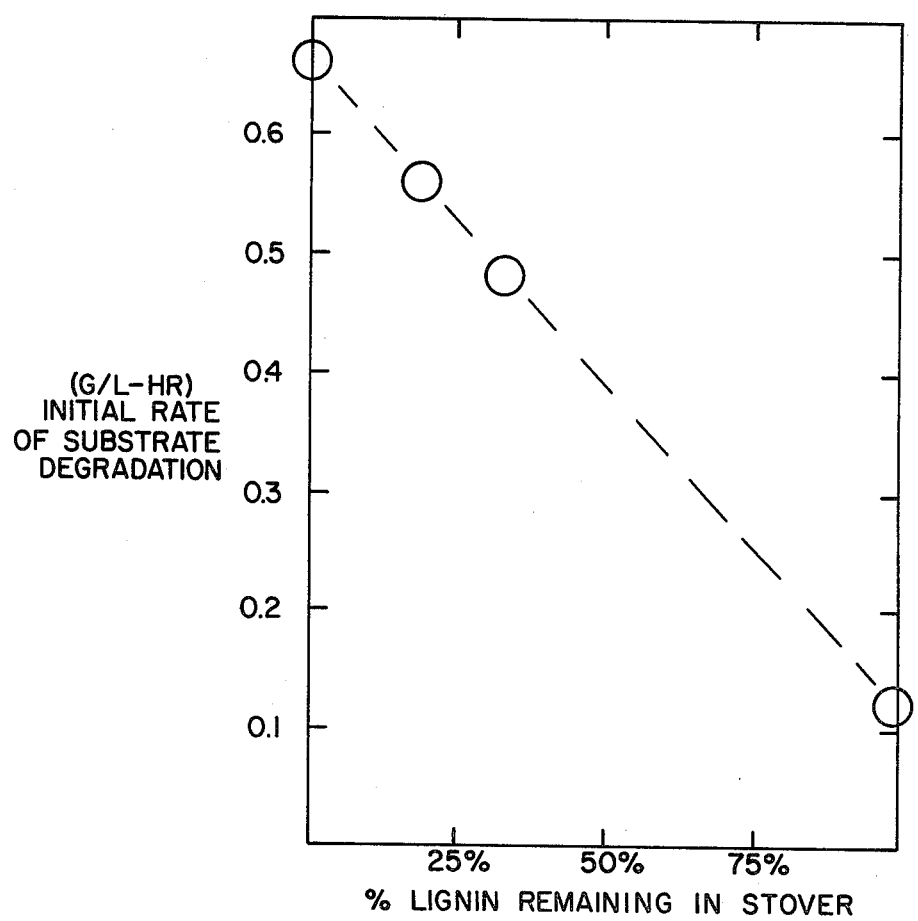

The fermentation performance of alkaline pretreated corn stover has been examined with mixed cultures of ATCC 31924 and ATCC 31925. As shown in FIG. 5, untreated corn stover (30 g/l) is slowly degraded at an initial rate of 0.12 g/l hr consuming only 25% of the total solids after 100 hrs. By contrast, corn stover pretreated at 25° C. is degraded at an initial rate of 0.48 g/l hr and is over 75% degraded after 100 hrs. A plot of lignin content versus the initial rate of degradation of corn stover, and solka floc, a ball milled spruce wood containing virtually no lignin is shown in FIG. 6. A linear correlation of lignin content and initial rate is observed.

In conclusion, the use of an alkaline solution containing 50% ethanol at ambient temperatures has been shown to be an effective extractant for the delignification of cereal biomass such as corn stover in a manner which results in minimal simultaneous loss of fermentable carbohydrates. The subsequent fermentation performance of mixed culture on this treated material has shown greater than 4-fold improvement in the rate of substrate degradation. After pretreatment by this method, virtually all of the remaining carbohydrate can be utilized by the microorganism. This method is applicable to wheat straw, as well as all of the cereal grasses.

We claim:

1. The process for selectively extracting lignin from a cellulosic material containing cellulose, hemicellulose and lignin in order to obtain a cellulose composition wherein the weight ratio of pentosan to lignin is at least about 5:1 and the weight ratio of cellulose and hemicellulose to lignin is at least about 10:1 and greater than 90% of the initial cellulose and pentosan is retained, which comprises contacting said material with a solvent composition comprising water, between about 40 and about 75 volume % ethanol and a base, said solvent composition having a pH between about 11 and about 14, said extraction being conducted at a temperature between about 15° C. and about 70° C. for a period of time of between about 2 and about 80 hours.

2. A cellulose composition wherein the weight ratio of pentosan to lignin is at least 5:1 and the weight ratio of cellulose and pentosan to lignin is at least about 10:1, said composition being prepared by the process of claim 1.

3. The composition of claim 2 wherein the weight ratio of pentosan to lignin is at least about 6:1 and the weight ratio of cellulose and pentosan to lignin is at least about 13:1.

4. The process of claim 1 wherein the base is sodium hydroxide.

5. The process of claim 1 wherein the pH is between about 12 and 14.

6. The process of claim 1 wherein the temperature is between about 15° C. and 30° C.

7. The process of claim 1 wherein the extraction time is between about 2 and about 80 hours.

8. The process of claim 1 wherein the extracting solvent comprising water and ethanol is recovered by addition of calcium to remove lignin therefrom.

9. The process of claim 1 wherein the extracting solvent comprising water and ethanol is recovered by reducing the pH of the solvent to below about 10 thereby to remove lignin therefrom.

10. The process of claim 1 wherein the extracting solvent comprising water and ethanol is recovered by adsorption to remove lignin therefrom.

* * * * *